United States Patent
Partlo

(10) Patent No.: US 7,899,095 B2
(45) Date of Patent: Mar. 1, 2011

(54) LASER LITHOGRAPHY SYSTEM WITH IMPROVED BANDWIDTH CONTROL

(75) Inventor: William N. Partlo, Poway, CA (US)

(73) Assignee: Cymer, Inc., San Diego, CA (US)

( * ) Notice: Subject to any disclaimer, the term of this patent is extended or adjusted under 35 U.S.C. 154(b) by 272 days.

(21) Appl. No.: 12/082,301

(22) Filed: Apr. 9, 2008

(65) Prior Publication Data

US 2008/0253413 A1    Oct. 16, 2008

Related U.S. Application Data

(60) Provisional application No. 60/923,486, filed on Apr. 13, 2007.

(51) Int. Cl.
*H01S 3/097* (2006.01)
*H01S 3/098* (2006.01)
*H01S 3/1055* (2006.01)
*H01S 3/123* (2006.01)
*H01S 3/125* (2006.01)

(52) U.S. Cl. ............... 372/29.011; 372/32; 372/55; 372/99; 372/100; 372/102; 372/81

(58) Field of Classification Search ........... 372/29.011, 372/32, 55, 81, 99, 100, 102
See application file for complete search history.

(56) References Cited

U.S. PATENT DOCUMENTS

| | | | |
|---|---|---|---|
| 6,393,037 B1 * | 5/2002 | Basting et al. ............. 372/20 |
| RE38,039 E * | 3/2003 | Kleinschmidt et al. ...... 372/100 |
| 6,539,046 B2 | 3/2003 | Newman et al. ............ 372/98 |
| 6,894,785 B2 | 5/2005 | Rao et al. .................. 356/450 |
| 6,952,267 B2 | 10/2005 | Rafac ........................ 356/454 |
| 7,256,893 B2 | 8/2007 | Rafac ........................ 356/454 |

(Continued)

FOREIGN PATENT DOCUMENTS

JP       2006-024855       1/2006

(Continued)

OTHER PUBLICATIONS

Huggins, Kevin; et al., "Effects of laser bandwidth one OPE in a modern lighography tool"; Optical Microlithography XIX, SPIE vol. 6154; 61540Z (2006); DOI: 1117/12/656816.

(Continued)

*Primary Examiner*—Minsun Harvey
*Assistant Examiner*—Michael Carter
(74) *Attorney, Agent, or Firm*—DiBerardino Law LLC

(57) ABSTRACT

A method and apparatus may comprise a seed laser, along with an amplifier laser amplifying the output of the seed laser. A bandwidth metrology module may provide a bandwidth measurement and a bandwidth error signal may be provided using a bandwidth set point. A differential timing system responsive to the error signal can selectively adjust a differential firing time between the seed laser and amplifier laser. A beam dimension and center wavelength control system may adjust a beam dimension, within the cavity of the seed laser, to select bandwidth, and may adjust center wavelength at the same time, using a plurality of beam expansion prisms and at least one other prism or other optical element in the cavity to select center wavelength.

20 Claims, 4 Drawing Sheets

U.S. PATENT DOCUMENTS

| | | | |
|---|---|---|---|
| 2002/0006148 A1* | 1/2002 | Govorkov et al. | 372/55 |
| 2002/0012374 A1* | 1/2002 | Basting et al. | 372/55 |
| 2002/0085606 A1* | 7/2002 | Ness et al. | 372/55 |
| 2002/0101900 A1* | 8/2002 | Govorkov et al. | 372/57 |
| 2003/0227954 A1* | 12/2003 | Ariga et al. | 372/55 |
| 2005/0094698 A1 | 5/2005 | Besaucele et al. | 372/57 |
| 2005/0185690 A1 | 8/2005 | Rule et al. | 372/55 |
| 2006/0114956 A1 | 6/2006 | Sandstrom et al. | 372/55 |
| 2006/0114958 A1 | 6/2006 | Trintchouk et al. | 372/55 |
| 2006/0146900 A1 | 7/2006 | Jacquest et al. | 372/38.1 |
| 2007/0001127 A1 | 1/2007 | Reiley et al. | 240/492.2 |
| 2007/0013913 A1 | 1/2007 | Rafac | 356/451 |
| 2007/0195836 A1 | 8/2007 | Dunstan et al. | 372/32 |
| 2008/0232408 A1 | 9/2008 | O'Brien et al. | 372/19 |
| 2008/0253408 A1 | 10/2008 | Ishihara | 372/20 |

FOREIGN PATENT DOCUMENTS

| | | | |
|---|---|---|---|
| JP | 2006024855 | * | 1/2006 |

OTHER PUBLICATIONS

Rafac, Robert; "Overcoming limitations of etalon spectrometers used for spectral metrology of DUV excimer light sources"; Optical Microlithography XVII; SPIE vol. 5377 (2004) DOI: 10.1117/12/4556622.

* cited by examiner

LASER LITHOGRAPHY SYSTEM WITH IMPROVED BANDWIDTH CONTROL

CROSS-REFERENCE TO RELATED APPLICATIONS

The present application claims priority to Provisional Application Ser. No. 60/923,486, filed on Apr. 13, 2007, entitled TWO STAGE EXCIMER LASER WITH SYSTEM FOR BANDWIDTH CONTROL, hereby incorporated herein by reference. The present application is related to U.S. patent application Ser. No. 12/082,254, entitled METHOD AND APPARATUS TO CONTROL OUTPUT SPECTRUM BANDWIDTH OF MOPA OR MOPO LASER, filed contemporaneously with the present application and hereby incorporated herein by reference, and is related to U.S. patent application Ser. No. 12/082,253, entitled METHOD AND APPARATUS FOR STABILIZING AND TUNING THE BANDWIDTH OF LASER LIGHT, filed contemporaneously with the present application, hereby incorporated herein by reference.

FIELD OF THE DISCLOSED SUBJECT MATTER

The disclosed subject matter related to active control of bandwidth in a DUV laser lithography system and more particularly relates to an excimer or molecular fluorine gas laser system used in a line narrowed application, such as, as a laser light source for integrated circuit manufacturing in photolithography.

BACKGROUND

Certain photolithography parameters, including the variation of critical dimension ("CD") printed with pitch, otherwise sometimes referred to as Optical Proximity Effect ("OPE"), in a scanner imaging system, show a behavior that is characteristic of the imaging and process conditions and is sensitive to variations in those conditions. Maintaining stable process conditions can improve the effectiveness of mask Optical Proximity Correction ("OPC") used to offset the effects of OPE. One of the factors which affects the OPE is the spectral bandwidth of the light source. To date, passive bandwidth stabilization techniques have been effective in meeting OPE control requirements. However, future tighter OPE specifications, among other things, will require advanced bandwidth control techniques. Applicants believe that future tighter OPE specifications will require active control techniques to both improve the stability of $E_{95}$ bandwidth, and also regulate $E_{95}$ bandwidth to a desired setpoint (i.e., within a selected very narrow range). The recent work of Huggins et al., "Effects of laser bandwidth on OPE in a modern lithography tool.", Optical Microlithography XVIII (2006), describes how controlling the spectral properties of the laser light, specifically $E_{95}$ bandwidth, has an effect of similar magnitude to those from other control parameters, such as focus shift, dose shift and partial coherence shift. The bandwidth metric, $E_{95}$, is defined as the width of the spectrum (typically in picometers) that contains 95% of the integrated spectral intensity. A second bandwidth metric that is commonly employed is the Full Width at Half-Maximum (FWHM), which, although easier to measure than $E_{95}$, does not affect OPE as significantly.

State of the art on board metrology, used to accurately measure E95 bandwidth, as discussed in one or more of the above referenced co-pending U.S. patent applications, has enabled a new array of active control solutions to be deployed. Advanced spectral engineering techniques, including sophisticated control algorithms, according to aspects of an embodiment of the disclosed subject matter, are disclosed to be able to be used to stabilize and regulate the bandwidth of the lithography light source while maintaining other key performance specifications.

In dual chamber lasers, such as in a master oscillator/power amplifier ("MOPA") configuration or master oscillator/power oscillator ("MOPO") configuration, bandwidth, such as, E95 bandwidth, may be seen to be sensitive to the relative time delay, denoted $\Delta tMOPA$, between the commutation of the MO and PA/PO pulse power. The MO output pulse becomes more line-narrowed over its duration, having traversed the line narrowing module more often. Consequently, as the PA chamber is fired later relative to the MO chamber, it selects a more line-narrowed portion of the MO pulse and the effective E95 bandwidth of the output of the entire laser system also decreases. FIG. 2 shows how E95 bandwidth can vary as differential firing time is adjusted, by way of example only and not limited to, on a typical MOPA configuration dual chamber laser system. It will be understood that differential firing time or dtMOPA or $\Delta tMOPA$ are all short hand expressions for the concept of the difference in the timing of the electric discharge between the pair of electrodes in the seed laser and the pair of electrodes in the amplifier laser, whether specifically the amplifier laser is a power amplifier, an amplifier configured as a power oscillator or a power ring amplifier (an oscillating amplifier with a ring path through the amplifier gain medium).

According to aspects of an embodiment of the disclosed subject matter applicants propose developments in active stabilization of bandwidth.

A variable magnification line-narrowing module is described in U.S. Pat. No. 6,393,037 which issued to Basting et al., on May 21, 2002 ("Basting"), the contents of which are hereby incorporated by reference herein. The abstract of Basting describes a tunable laser including an angular dispersive element and a beam expander including one or two rotatable prisms along with a grating in a line narrowing module to adjust the bandwidth resulting from adjusting the magnification of the beam incident on the dispersive element. The prism beam expanders, when two are used, are disclosed to be mechanically linked to so that the angle of incidence of the beam on the dispersive element is not changed when the magnification changes. This arrangement makes it very difficult, if not impossible, to control center wavelength as well as bandwidth utilizing the rotatable prisms.

Several algorithms may be utilized, including an E95 feedback algorithm, a laser power feed forward algorithm, a dither control algorithm and a bandwidth control device ("BCD", such as a mechanism to modify the curvature of a dispersive wavelength/bandwidth selection dispersive optical element like a grating) curve trace algorithm. Applicants have proposed, by way of example, to use a measured E95 signal to determine an adjustment to the BCD position, with the aim of staying on a particular side of a BCD operating curve. This is illustrated by way of example in FIG. 1 of U.S. patent application Ser. No. 11/510,037 entitled, ACTIVE SPECTRAL CONTROL OF DUV LIGHT SOURCE ("the '037 Application"), FIGS. 1 and 2 of which are incorporated herein.

FIG. 2, also from the '037 application, illustrates an $E_{95}$ bandwidth control authority using $\Delta t_{MOPA}$. The use of differential firing time as a fine actuator to control $E_{95}$ bandwidth has a number of advantages, including, (1) the measurement of $E_{95}$ and the change of $\Delta t_{MOPA}$ both can occur on about a tens-of-pulses time scale, or shorter, such as, pulse-to-pulse, allowing for very high frequency disturbance rejection; and (2) the available range of actuation is large enough to attenuate/suppress the sources of bandwidth deviation being targeted, namely laser energy and the higher frequency effects of duty cycle variations.

Rafac, "Overcoming limitations of etalon spectrometers used for spectral metrology of DUV excimer light sources", Optical Microlithography XVII, Bruce W. Smith, Editor, Proceedings of SPIE, Volume 5377 (2004) pp. 846-858, which is hereby incorporated by reference, discusses methods and apparatus for calculating bandwidth, such as $E_{95}$ bandwidth. Other such wavemeters for performing measurements, calculating center wavelength and/or bandwidth and producing an output signal indicative thereof are well known in the art, e.g., as disclosed in U.S. Pat. No. 6,894,785 titled, "GAS DISCHARGE MOPA LASER SPECTRAL ANALYSIS MODULE" which issued on May 17, 2005, and in U.S. Pat. No. 6,539,046 titled, "WAVEMETER FOR GAS DISCHARGE LASER" which issued on Mar. 25, 2003, both of which are hereby incorporated by reference. In addition, techniques for calculating FWHM and E95 from wavemeter output data are disclosed in U.S. patent application Ser. No. 10/615,321, filed on Jul. 7, 2003, and entitled, "OPTICAL BANDWIDTH METER FOR LASER LIGHT", and U.S. patent application Ser. No. 10/609,223, filed on Jun. 26, 2003, and titled, "METHOD AND APPARATUS FOR MEASURING BANDWIDTH OF AN OPTICAL OUTPUT OF A LASER", both of which are hereby incorporated by reference herein.

GigaPhoton is believed to advertise a product that performs E95 control using some sort of optical actuation. Japanese Published Patent Application 2006024855, published on Jul. 9, 2004, discloses a variable magnification LNM, also with two rotatable prisms and the use of a differential discharge timing for bandwidth control. Such an arrangement makes it difficult, if not impossible, to control center wavelength and bandwidth with the prisms.

DETAILED DESCRIPTION OF THE DISCLOSED SUBJECT MATTER

According to aspects of an embodiment of the disclosed subject matter a laser system with improved bandwidth control may comprise a seed laser defining an optical cavity producing a seed laser output and an amplifier laser receiving and amplifying the seed laser output. A bandwidth metrology module may measure the bandwidth of the output of the laser system and provide a bandwidth measurement, which may be utilized in comparison to a set point to provide a bandwidth error signal. A differential timing system responsive to the bandwidth error signal may selectively adjust a differential firing time between the seed laser and amplifier laser to adjust bandwidth. Contrary to what is currently done in the art a beam dimension adjustment system that controllably adjusts a beam dimension of the beam within the cavity of the seed laser to selectively alter the bandwidth of the seed laser output and also that controllably adjusts the center wavelength at the same time, may comprise a plurality of beam expansion prisms and at least one other prism comprising a center wavelength selection prism or at least one other optical element comprising a center wavelength selection optical element. In operation, the beam dimension adjustment system may have a prism for coarse beam expansion control (to get the desired bandwidth close to the target/set point, for example within ±several femtometers or tens of femtometers, and a prism for fine beam expansion control (to get the bandwidth to the set point and control it to stay at the set point, such as within ±several tenths of a femtometer from the set point, along with a prism or other optical element for center wavelength control. In addition, an additional separate prism along with the center wavelength selection prism or other optical element may be similarly used for coarse and fine center wavelength control. Differential timing control may be used along with one beam expanding prism, operating as the fine bandwidth selection control, and thus not significantly interfering with control of other laser parameters that might be impacted by changing differential firing timing.

Figure 1:
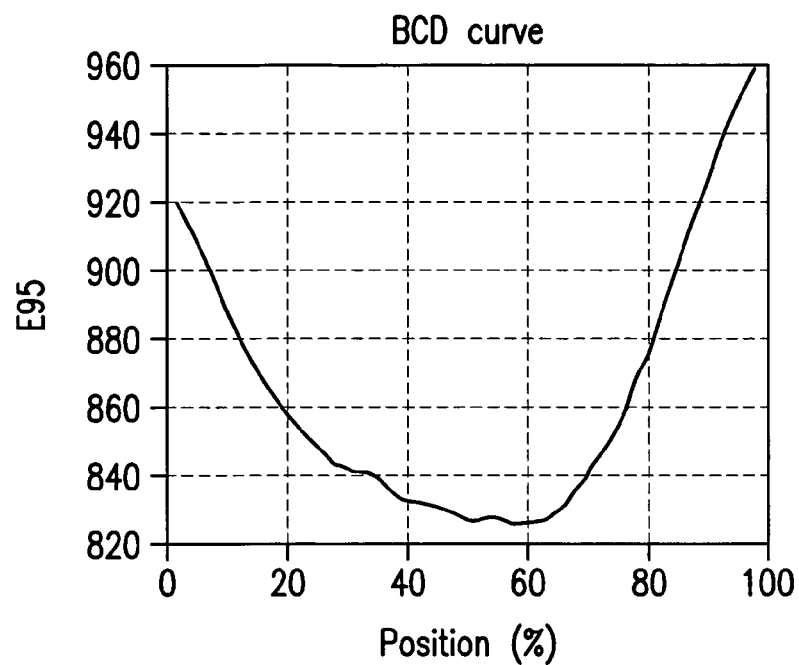
FIG. 1 shows a bandwidth control device $E_{95}$ sensitivity curve.
Figure 2:
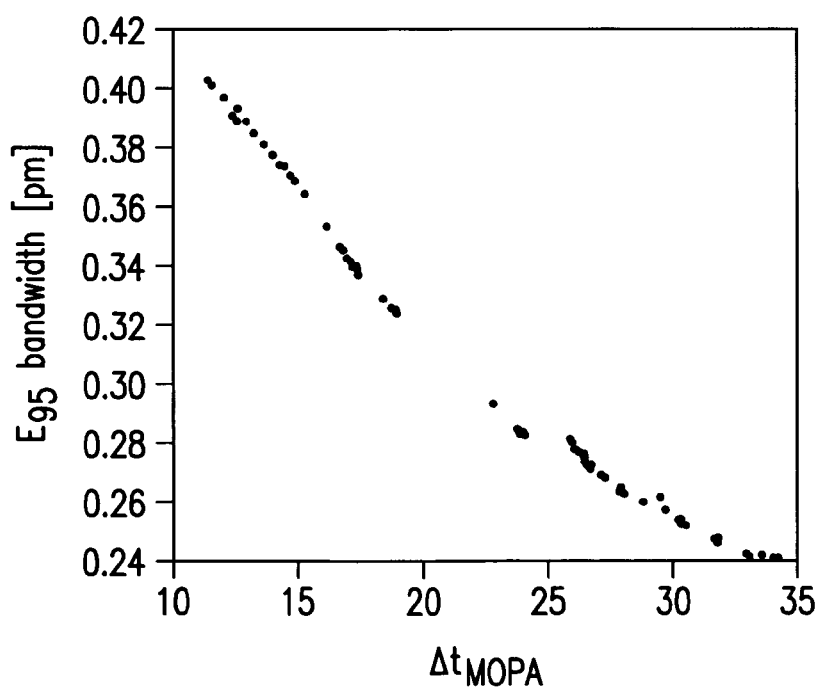
FIG. 2 illustrates an exemplary plot of the change of $E_{95}$ bandwidth with change in differential firing time between two chambers in a seed oscillator/amplifier gain medium laser system, according to aspects of an embodiment of the disclosed subject matter.
Figure 3:
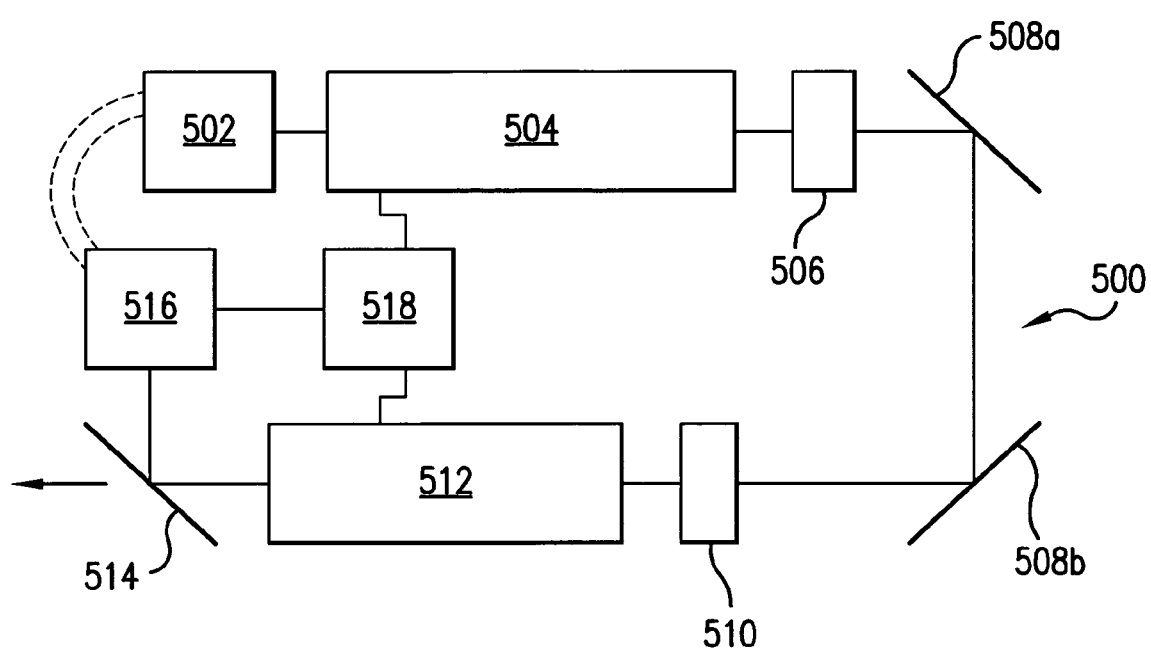
FIG. 3 shows schematically and in block diagram form a multi-stage gas discharge laser system having a variable magnification line narrowing module and differential firing time (dtMOPA) bandwidth control according to aspects of an embodiment of the disclosed subject matter.

FIG. 3 shows a multi-stage gas discharge laser 500 having both variable magnification line narrowing module and differential firing time (dtMOPA) bandwidth control. More specifically, the first stage may be either a master oscillator, MO and a subsequent stage may be a one-pass power amplifier, a multi-pass power amplifier, a power oscillator or a traveling wave amplifier such as a power ring amplifier, in which oscillation occurs in a resonance cavity acting as an amplification stage.

An example of such a laser system include some or all of the components shown in FIG. 3, depending on the configuration. The components shown in FIG. 3 include a variable magnification line-narrowing module 502, a first stage chamber 504, a first stage output coupler 506, turning optics 508a, b, an input coupler 510, a second stage chamber 512, a beam splitter 514, a bandwidth measurement module 516 and a discharge timing control module 518. The seed laser 504 may be a gas discharge excimer or molecular fluorine laser, such as an XCl, XF, KrF, ArF, $F_2$ or the like laser. These types of lasers are known for use in photolithography processing of wafers to make semiconductor circuits. The seed laser 504 may define an optical cavity, such as between the line narrowing module 502 and the output coupler 506 and produce an output. The amplifier laser 512 may receive the seed laser output through relay optics (mirrors 508a and b) and amplifying the seed laser output to produce a laser system output. The amplifier may generally match the output from the seed laser system in center wavelength of its output. The bandwidth metrology module 516, as is well known in the art, can measure the bandwidth of a laser output from the laser, i.e., at the output of the amplifier, and provide a bandwidth measurement which can be used by a bandwidth controller 516 to generate a bandwidth error compared to a target/setpoint. Differential timing may be adjusted in response to the error signal to adjust laser system output bandwidth.

Figure 4:
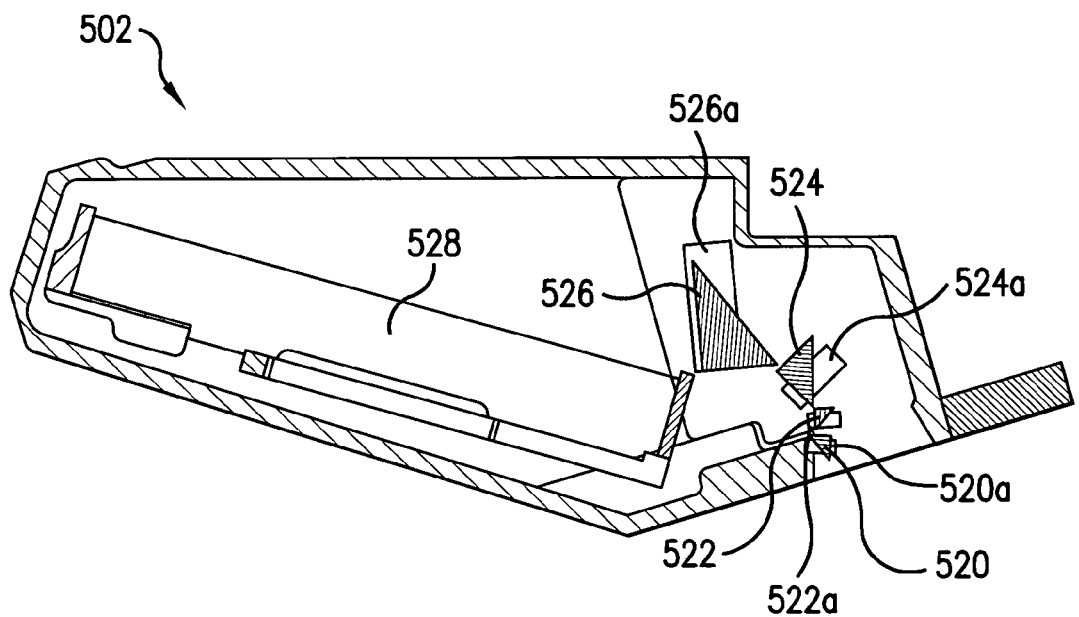
FIG. 4 shows schematically and in block diagram form an embodiment having four prisms and a grating, wherein at least one prism can be rotated to increase/decrease beam width and thereby alter bandwidth.

FIG. 4 shows a possible embodiment having four prisms 520, 522, 524, 526 and a grating 528. Prism 520 may be mounted on an actuator 520a, including a rotational motion mounting, e.g., a flexured mounting (not shown) so that the prism 520 may be rotatable via the actuator, such as a stepper motor and/or PZT (not shown) to increase/decrease beam width and thereby alter bandwidth, such as E95, FWHM, etc. Prism 522 may be left stationary or may also have an actuator 522a. Prism 524 may also be mounted for rotational movement, such as on an mounting that is rotatable via its actuator 524a, such as stepper motor (not shown) and/or a PZT (not shown) to finely adjust center wavelength (e.g., on the order of tenths of femtometers to femtometers). Prism 524 may also be mounted for rotational movement, such as on a mounting that is rotatable via an actuator 524a, such as a stepper motor (not shown) and/or PZT (not shown) to coarsely adjust center wavelength (e.g., on the order of tens of femtometers).

For some applications, the variable magnification line-narrowing-module 502 may be responsive to signals generated by the bandwidth measurement module 516. The variable magnification line-narrowing module 502 may be used for coarse bandwidth control with one or both of the bandwidth control rotatable prisms 520, 524 and the differential firing time (dtMOPA) used for fine bandwidth control. It will be understood that coarse bandwidth control may be executed by using only stepper motor or like mechanical actuation of the rotation of the respective prism mounting, with the coarse adjustments depending on the size of the prism, its position in the string of prisms in the beam dimension adjustment mechanism and the incremental size of the steps induced by the stepper motor or like mechanical position adjustor for the prism mount. Similarly, a much faster change, but also with much less incremental change in bandwidth or center wavelength, may be induced by an electro-actuated, magneto-actuated, or the like actuator, such as a PZT stack, well known for use in selection of center wavelength by positioning a maximally reflective mirror for the given wavelength mirror ("$R_{MAX}$") to select the angle of incidence of the beam on a dispersive grating. The PZT may be used for fine adjustments of the rotational position of the mirror actuator, such as rotation of a flexured mount for the mirror acting as the mirror's actuator 520a, 522a, 524a or 526a.

Figure 5:
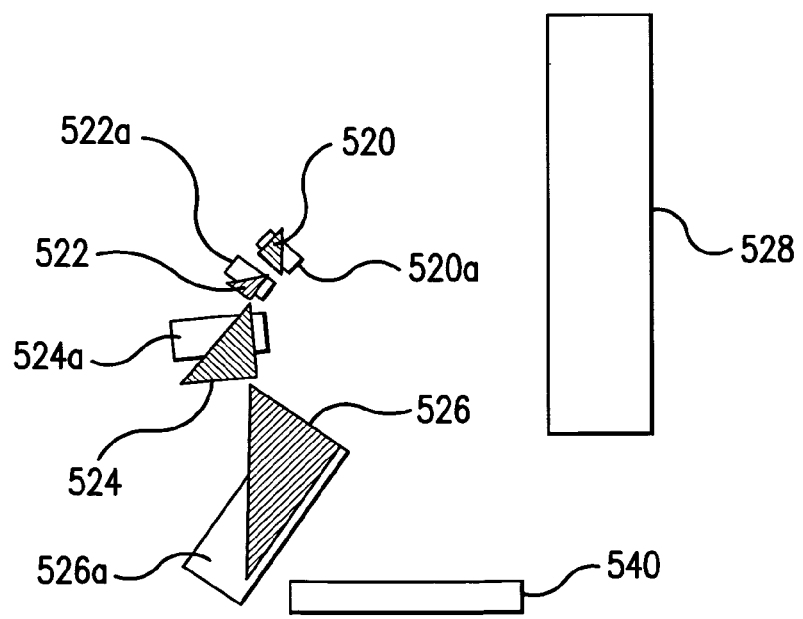
FIG. 5 shows schematically an embodiment of the disclosed subject matter having four prisms and a grating, wherein at least one prism can be rotated to increase/decrease beam width and thereby alter bandwidth, and a maximally reflective mirror at the given wavelength for center wavelength control.

FIG. 5 illustrates schematically a possible embodiment wherein such an $R_{MAX}$ mirror 540 and its actuator 540a, as is well known in the art for the laser system center wavelength selection, may be utilized to fold the expanded beam coming out of the beam expansion prism 526 onto a grating 528. The grating 528 may be an elongated grating in order to utilize the expanded beam, such as a 45× expanded beam. The mirror 540 may be used in part for center wavelength control by determining an angle of incidence of the beam on the grating 528. The $R_{MAX}$ folding mirrors known in the art themselves can have coarse and fine center wavelength control on a single optical element, i.e., utilizing a stepper motor (not shown) for coarse control and a PZT stack (not shown) for fine and fast center wavelength control, as noted above. In combination with a center wavelength control prism, such as prism 520, the $R_{MAX}$ mirror 540 may retain such control of its angle in relation to the grating 528 or utilize only the fine control of the PZT stack and not employ any stepper motor control. The center wavelength control prism, such as prism 520, may be used for coarse control and the $R_{MAX}$ folding mirror 540 may then be used for finer center wavelength control, or vice-versa.

In the latter embodiment, the PZT stack may be eliminated and only a stepper motor used to position the $R_{MAX}$ folding mirror for coarse center wavelength control, while the center wavelength control prism can be used for finer center wavelength selection. Alternatively, each of the prism mounts in the chain of prisms in the beam expansion mechanism may have an $R_{MAX}$-like coarse and fine control with a stepper motor for coarse adjustment and a PZT stack for fine adjustment, or the coarse adjusting prism may be controlled with a stepper motor, or the like mechanical adjustment, and the fine adjustment prism(s) by a faster and finer control actuator, such as a PZT stack.

A beam dimension and center wavelength adjustment system such as mirrors 520, 522, 524 and 526 and their actuators 520a, 522a, 524a and 526a, can adjust a beam dimension of a beam, within the cavity of the seed laser, to selectively alter the bandwidth of the seed laser output, and also adjust center wavelength at the same time and unlike the prior art at least two prism may be used for coarse and fine control of bandwidth and at least one other prism used for selection of center wavelength alone or with a fourth prism or another optical element. The beam dimension and center wavelength control system may include actuators to rotate each beam expansion prism and the at least one other prism comprising a center wavelength selection prism. The differential timing system may adjust the differential firing time to maintain bandwidth within a selected range about a target/set point, such as ±several femtometers on either side of the set point. The center wavelength selection prism may include at least two center wavelength selection prisms, a coarse center wavelength selection prism and a fine center wavelength selection prism. The center wavelength control system may include a prism in the beam expansion system chain of prisms and another optical element, such as an angle of incidence selection mirror, with either operating as the coarse control and the other operating as the fine control for center wavelength.

A center wavelength selection mechanism may include a dispersive optical element and the center wavelength selection prism and/or other center wavelength selection optical element may controllably adjust an angle of incidence of the beam upon the dispersive optical element. The differential timing system may comprise a coarse bandwidth control adjustment, or vice versa. Various combinations of coarse and fine bandwidth and/or center wavelength control actuation may be employed.

Figure 6:
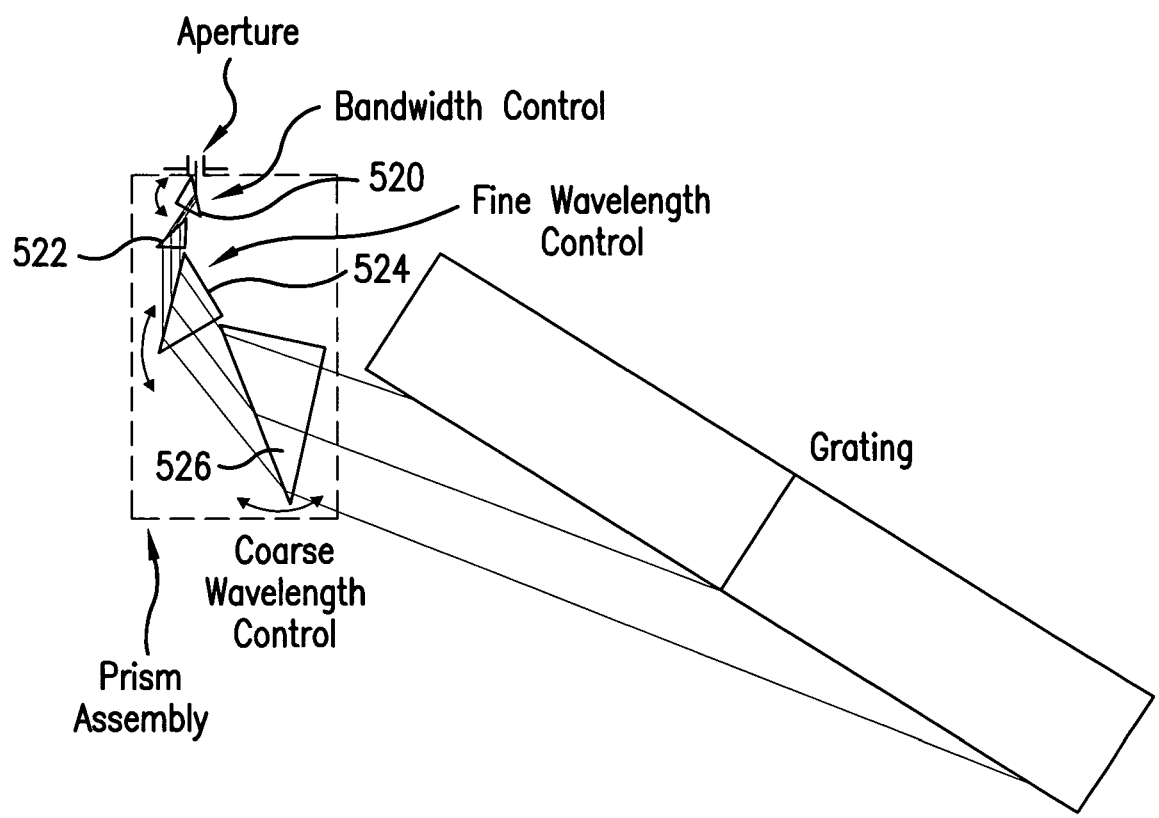
FIG. 6 shows schematically another possible embodiment.

According to another possible embodiment, illustrated schematically in FIG. 6, an LNM with four prisms 520, 522, 524 and 526 to control bandwidth and wavelength is shown. Two of the prisms 524 and 526 can be rotated by actuators (not shown) similarly to the actuators for the prisms 524, 526 show in FIGS. 4 and 5. One 526 may be rotated by a stepper motor actuator (not shown) and the other 524 may be rotated by a PZT stack (not shown). These two prisms 526 and 524 respectively may be used for coarse and fine adjustment of wavelength. Their positioning may be in response to signals from a center wavelength controller system responding to center wavelength being not on target due to target change or center wavelength drift. At least one of the other prisms may be rotatable for bandwidth control, such as, prism 520. Rotation may be achieved using a stepper motor (not shown).

It will be understood by those skilled in the art that aspects of embodiments of the subject matter disclosed above are intended to satisfy the requirement of disclosing at least one enabling embodiment of the subject matter of each claim and to be one or more such exemplary embodiments only and to not to limit the scope of any of the claims in any way and particularly not to a specific disclosed embodiment alone.

Many changes and modification can be made to the disclosed aspects of embodiments of the disclosed subject matter of the claims that will be understood and appreciated by those skilled in the art, particularly in regard to interpretation of the claims for purposes of the doctrine of equivalents. The appended claims are intended in scope and meaning to cover not only the disclosed aspects of embodiments of the claimed subject matter but also such equivalents and other modifications and changes that would be apparent to those skilled in the art. In additions to changes and modifications to the disclosed and claimed aspects of the subject matter disclosed of the present invention(s) noted above, others could be implemented.

I claim:

1. An apparatus comprising:
   a seed laser defining an optical cavity producing an output;
   an amplifier laser receiving and amplifying the output of the seed laser and providing a laser system output;
   a bandwidth metrology module measuring laser output bandwidth and providing a bandwidth measurement;
   a center wavelength metrology module measuring laser output center wavelength and providing a center wavelength measurement;
   a differential timing system responsive to said bandwidth measurement to selectively adjust a differential firing time between the seed laser and amplifier;
   a dispersive optical element;
   a first prism responsive to said bandwidth measurement to rotate relative to the dispersive optical element and selectively alter the laser output bandwidth; and
   second and third prisms responsive to said center wavelength measurement to rotate relative to the dispersive optical element and selectively alter center wavelength.

2. The apparatus of claim 1 wherein:
   the differential timing system adjusts the differential firing time to maintain bandwidth within a selected range of bandwidths.

3. The apparatus of claim 2 wherein:
   the second and third prisms comprises a coarse center wavelength selection prism and a fine center wavelength selection prism.

4. The apparatus of claim 2 wherein:
   the second and third prisms comprises a coarse center wavelength selection prism and a fine center wavelength selection prism.

5. The apparatus of claim 1 further comprising:
   the second and third prisms adjust an angle of incidence of the beam upon the dispersive optical element.

6. The apparatus of claim 2 further comprising:
   the second and third prisms adjust an angle of incidence of the beam upon the dispersive optical element.

7. The apparatus of claim 1 further comprising:
   the system selectively adjusting the differential firing time comprising a fine bandwidth control adjustment; and
   the first prism responsive to said bandwidth measurement to rotate relative to the dispersive optical element comprising a coarse bandwidth control adjustment.

8. The apparatus of claim 5 further comprising:
   the system selectively adjusting the differential firing time comprising a fine bandwidth control adjustment; and
   the first prism responsive to said bandwidth measurement to rotate relative to the dispersive optical element comprising a coarse bandwidth control adjustment.

9. The apparatus of claim 6 further comprising:
   the system selectively adjusting the differential firing time comprising a fine bandwidth control adjustment; and
   the first prism responsive to said bandwidth measurement to rotate relative to the dispersive optical element comprising a coarse bandwidth control adjustment.

10. An apparatus comprising:
    a seed laser defining an optical cavity producing an output;
    an amplifier laser receiving and amplifying the output of the seed laser and providing a laser system output;
    a bandwidth metrology module measuring laser output bandwidth light and providing a bandwidth measurement;
    a center wavelength metrology module measuring laser output center wavelength and providing a center wavelength measurement;
    a differential timing system responsive to said bandwidth measurement to selectively adjust a differential firing time between the seed laser and amplifier;
    a dispersive optical element;
    a first prism responsive to said bandwidth measurement to rotate relative to the dispersive optical element and selectively alter the laser output bandwidth; and
    a second prism and mirror responsive to said center wavelength measurement to rotate relative to the dispersive optical element and selectively alter center wavelength.

11. The apparatus of claim 10 wherein:
    the differential timing system adjusts the differential firing time to maintain bandwidth within a selected range of bandwidths.

12. The apparatus of claim 10 wherein:
    the second prism and mirror comprises a coarse center wavelength selector and a fine center wavelength selector.

13. The apparatus of claim 11 wherein:
    the second prism and mirror comprises a coarse center wavelength selector and a fine center wavelength selector.

14. The apparatus of claim 10 further comprising:
    a third prism operating in conjunction with the second prism to select center wavelength.

15. The apparatus of claim 11 further comprising:
    a third prism operating in conjunction with the second prism to select center wavelength.

16. The apparatus of claim 10 further comprising:
    the second prism and mirror adjust an angle of incidence of the beam upon the dispersive optical element.

17. The apparatus of claim 12 further comprising:
    the second prism and mirror adjusts an angle of incidence of the beam upon the dispersive optical element.

18. The apparatus of claim 10 further comprising:
    the system selectively adjusting the differential firing time comprising a fine bandwidth control adjustment; and
    the first prism responsive to said bandwidth measurement to rotate relative to the dispersive optical element comprising a coarse bandwidth control adjustment.

19. The apparatus of claim 17 further comprising:
    the system selectively adjusting the differential firing time comprising a fine bandwidth control adjustment; and
    the first prism responsive to said bandwidth measurement to rotate relative to the dispersive optical element comprising a coarse bandwidth control adjustment.

20. The apparatus of claim 16 further comprising:
    the system selectively adjusting the differential firing time comprising a fine bandwidth control adjustment; and
    the first prism responsive to said bandwidth measurement to rotate relative to the dispersive optical element comprising a coarse bandwidth control adjustment.

* * * * *